US006310126B1

(12) United States Patent
Osborn

(10) Patent No.: US 6,310,126 B1
(45) Date of Patent: Oct. 30, 2001

(54) MIXER AND PROCESS FOR USE

(75) Inventor: John D. Osborn, Port Bolivar, TX (US)

(73) Assignee: Texas Encore Materials, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/626,539

(22) Filed: Jul. 27, 2000

Related U.S. Application Data

(63) Continuation-in-part of application No. 08/677,697, filed on Jul. 10, 1996, now abandoned, which is a continuation-in-part of application No. 08/391,386, filed on Feb. 21, 1995, now Pat. No. 5,604,277, which is a continuation of application No. 08/277,014, filed on Apr. 13, 1994, now Pat. No. 5,488,080, which is a continuation of application No. 07/886,338, filed on Mar. 20, 1992, now abandoned.

(51) Int. Cl.[7] ................ C08L 9/00; C08L 7/00; C08K 5/092

(52) U.S. Cl. .............. 524/274; 524/270; 524/271; 521/40.5; 521/41; 521/43; 521/43.5; 521/44

(58) Field of Search .................. 524/270, 271, 524/274; 521/40.5, 41, 43, 43.5, 44

(56) References Cited

U.S. PATENT DOCUMENTS

| 5,488,080 | * | 1/1996 | Osborn | 524/270 |
| 5,604,277 | * | 2/1997 | Osborn | 524/270 |

* cited by examiner

*Primary Examiner*—Peter Szekely
(74) *Attorney, Agent, or Firm*—David M. Ostfeld

(57) ABSTRACT

A mixer and method of using the mixer is disclosed in which a closed chambered vessel capable of both holding pressure and vacuum is charged with a mixture of elastomer and materials taken from the group of tall oil, fatty acids and residues of tall oil production. The charge mixture is heated under pressure without excessive friction heat. After the heating cycle, the mixer atmosphere is evacuated under vacuum, and then the mix is discharged.

15 Claims, 3 Drawing Sheets

MIXER AND PROCESS FOR USE

CROSS REFERENCE TO RELATED APPLICATIONS

This application is a continuation-in-part of U.S. application Ser. No. 08/677,697, filed Jul. 10, 1996, entitled Improved Pavement Material which is a continuation-in-part of U.S. application Ser. No. 08/391,386, filed Feb. 21, 1995, entitled Rubber and Plastic Bonding, which is now U.S. Pat. No. 5,604,277, issued Feb. 18, 1997, which is a continuation of U.S. application Ser. No. 08/277,014 filed Apr. 13, 1994, now U.S. Pat. No. 5,488,080, issued Jan. 30, 1996, entitled Rubber and Plastic Bonding which is a continuation of U.S. Ser. No. 07/886,338, Filed May 20, 1992, now abandoned. These are incorporated herein by reference.

BACKGROUND OF THE INVENTION

1. Field of the Invention

The invention relates generally to a mixer and process directed to the utilization of crumb rubber produced from scrap tire carcass by effectively drying and converting crumb rubber to a Dry Liquid Concentrate enhancing the use of crumb rubber with asphalt, thermo plastic and chemically catalyzed materials where limited moisture is desired.

2. Description of the Prior Art

Each year there are an estimated 250,000,000 scrap tires discarded throughout the United States. Unwanted scrap tire piles, scattered throughout the country, have been estimated as high as 3 billion units. The poor biodegradability of scrap tire, their tendency to trap gases and rise to the surface in landfills, the serious fire hazard scrap tire piles represent, and the breeding environment that unwanted scrap tire piles offer to disease carrying pests, such as rodents and mosquitos, has caused them to be classified as a serious environmental nuisance.

Attempts to reuse the materials composing scrap tires have had very limited economic success. Many of these involve destructive distillation. The approaches to reuse, burn, or distill scrap tires appear not to have been commercially successful and had little effect on reducing either the flow or accumulation of scrap tire carcasses.

Truck tire carcasses with acceptable sidewall structure are recapped. The original tread stock of a used truck tire is removed by buffing. The resulting tire buffings, generated from the removal of the original tread stock, have been the primary feedstock material for the United States tire generated crumb rubber industry. This utilization, however, is limited in its scope and does not address the problem presented by scrap passenger or truck tire carcasses no longer suitable to be recapped.

Other methods of using scrap tire carcasses have included burning tire chips for BTU value and low and high vacuum pyrolysis to recover oil, carbon black, steel and fiber.

Several methods have been employed to enhance the value of scrap tire derived crumb rubber in vulcanized curing procedures. These methods are: polymeric coatings to enchanced-manufacture in rubber goods, addition of various quantities of tall oil derived fatty acids to adhere rubber particles into a useful mass, sulfur additions to act as a vulcanizing agent, and various complete devulcanization processes. The generated crumb rubber is also used in minimal percentages with virgin rubber as a filler and mixed with hot asphalt as a modifier.

Plastics is a multibillion dollar industry which produces synthetic materials and products, many of which were never dreamed of only a few years ago. Today, civilization requires synthetic materials (artificial resins produced by chemical reactions of organic substances). Many products made of plastic produced materials are produced at less cost than was possible with natural materials.

Plastics, unlike glass or aluminum, are not easily recycled back into useful products, such as those from which they were generated. Plastics, being a specifically engineered, rather than a generic material, are sorted prior to recycling. Plastics are seldom remanufactured back into the product or part which generated them. Often, recycled plastics are more expensive than new polymers. Examples of plastics which are recycled include (1) high-density polyethylene ("HDPE") and low-density polyethylene ("LDPE") into boards, binds, and trash cans and (2) polyethylene terephthalate ("PET") into carpet fiber. The markets for recycled plastics have been slow to develop and do not appear to be able to keep pace with the generation of new plastic materials. Once plastics are molded or spun, they lose some of the characteristics or properties of the virgin material. This creates a much bigger problem than scrap tires because the United States generates over 12 billion tons of scrap plastics per year, most of which is destined for deposit in landfills.

Moisture content can be a hindrance to the utilization of crumb rubber in heat driven applications. See U.S. Pat. Nos. 5,488,080 and 5,604,277, both of which are to John D. Osborn. Three common apparatus and methods of drying known in the prior art are illustrated below, when they were used to dry crumb rubber combined with tall oil and other fatty acids:

Compared Methods of Drying

1. The tray of a dehydration unit typical to drying foods such fruit was loaded with ½ pound of 30 mesh crumb rubber which had been combined with tall oil, fatty acid and residues of tall oil production at a by weight ratio of 10%. A Carl Fisher moisture test was performed on the mixture yielding a pre-dried moisture content of 0.79%. The unit was operated under standard low heat for a period of eight hours. After discharge, the temperature was measured at 180° F. The Dry Liquid Concentrate was again tested for moisture by Carl Fisher. The resulting moisture content was measured at 0.34%.
2. A fluidized bed dryer was heated to a temperature of 200° F. A sample of 30 mesh crumb rubber was combined with tall oil, fatty acid at 10% by weight. A Carl Fisher moisture test was performed on the mixture yielding a pre-dried moisture of 0.87%. The Dry Liquid Concentrate was placed in the dryer and held for four hours. At discharge, the temperature of the Dry Liquid Concentrate was measured at 195° F. A Carl Fisher moisture test was again performed yielding moisture content of 0.21%.
3. A 300-liter horizontal mixer equipped with a vacuum pump and heated jacket was heated to 300° F. A 100 pound sample of 30 mesh crumb rubber was combined with tall oil, fatty acids and residues of tall oil production at 10% by weight rate. A Carl Fisher moisture test was performed prior to drying yielding a result of 0.79%. A 15 minute cycle was performed with vacuum pulled to a total of 26.4 inches hg. Temperature at discharge was measured at 211° F. A Carl Fisher moisture test was again performed yielding moisture content of 0.14%.

Crumb rubber or cross-linked granular rubber powder is hygroscopic by nature with a latent moisture content of typically less than one percent when produced by industry standard crumb rubber production technology. This moisture content interferes with crumb rubber's use in many heat driven applications such as molding with thermoplastics and blending with asphalt binder whose applications use heat in excess of 212° F. Chemically catalyzed applications may also require crumb rubber to have limited moisture contents to optimize performance. Heat aging of the crumb rubber may also cause further vulcanization or crystallization of the rubber polymers limiting the effectiveness of direct heat as a drying method. Crumb rubber is a poor conductor of heat requiring excessive energy to drive off moisture. Excessive heat may also heat age the crumb rubber limiting usefulness.

It would be desirable to develop a cost feasible economic method of processing crumb rubber into a substantially dry raw material for use in heat driven applications such as thermoplastic, asphalt binder modification, as well as moisture-sensitive chemically-catalyzed materials.

It is well-known in the art to use tall oil with ground rubber waste for reuse as rubber. See "Ground Rubber Waste—A Supplementary Raw Material for the Rubber Industry" issued by Kahl & Co.; U.S. Pat. No. 4,481,335, issued Nov. 6, 1984 to Stark, Jr. entitled "Rubber Composition and Method"; U.S. Pat. No. 3,873,482, issued Mar. 25, 1975 to Severson et al., entitled "Pyrolyzed Tall Oil Products as Synthetic Rubber Tackifiers"; U.S. Pat. No. 4,895,911, issued Jan. 23, 1990 to Mowdood et al., entitled "Tall Oil Fatty Acid Mixture in Rubber"; U.S. Pat. No. 4,792,589, issued Dec. 20, 1988 to Colvin et al., entitled "Rubber Vulcanization Agents of Sulfur and Olefin"; and U.S. Pat. No. 4,224,841, issued Jan. 13, 1981 to Frankland, entitled "Method for Recycling Rubber and Recycled Rubber Product". Generally for the area of ground polymer elastomer operation, see US. Pat. No. 4,771,110, issued Sep. 13, 1988 to Bouman et al., entitled "Polymeric Materials Having Controlled Physical Properties and Purposes for Obtaining These"; and for rubber discussions see U.S. Pat. No. 3,544, 492, issued Dec. 1, 1970 to Taylor et al., entitled "Sulfur Containing Curing Agents"; and "Organic Chemistry" by Fieser and Fieser printed 1944 by D. C. Heath & Co. Boston, pages 346 and 347.

SUMMARY OF THE INVENTION

The present invention includes a mixer and process to both surface modify crumb rubber with tall oil, fatty acids and residues of tall oil production, as well as substantially dry, to less than 0.1%, the above mentioned crumb rubber through a controlled environment mixing system.

Utilization of crumb rubber as raw material is hampered in that vulcanization forms an irreversible chemical bond. The addition of tall oil, fatty acids and residues of tall oil production swell and soften the rubber particle to facilitate surface bonding with thermo plastics, integration with asphalt and surface bonding in crosslink applications.

In the invention the desired mixer is a closed chamber vessel capable of both holding pressure and vacuum. The mixing action is desired to be of low shear, medium intensity, yielding the mixture integration of the tall oil, fatty acids and residues of tall oil production with the crumb rubber without excessive friction heat. The mixer must have a controlled temperature environment. Typical industry machinery having the ability to incorporate the above mentioned requirements is a properly equipped horizontal mixer.

The process for use of the equipment is to use heat and pressure first, and then, vacuum in the addition of tall oil, fatty acids and residues of tall oil production to crumb rubber to produce a substantially dried, non-heat aged crumb rubber dry liquid concentrate useful as a raw material for manufacturing.

BRIEF DESCRIPTION OF THE DRAWINGS

For a further understanding of the nature and objects of the present invention, reference should be had to the following drawings in which like parts are given like reference numerals and wherein.

DESCRIPTION OF THE PREFERRED EMBODIMENTS

Figure 1:
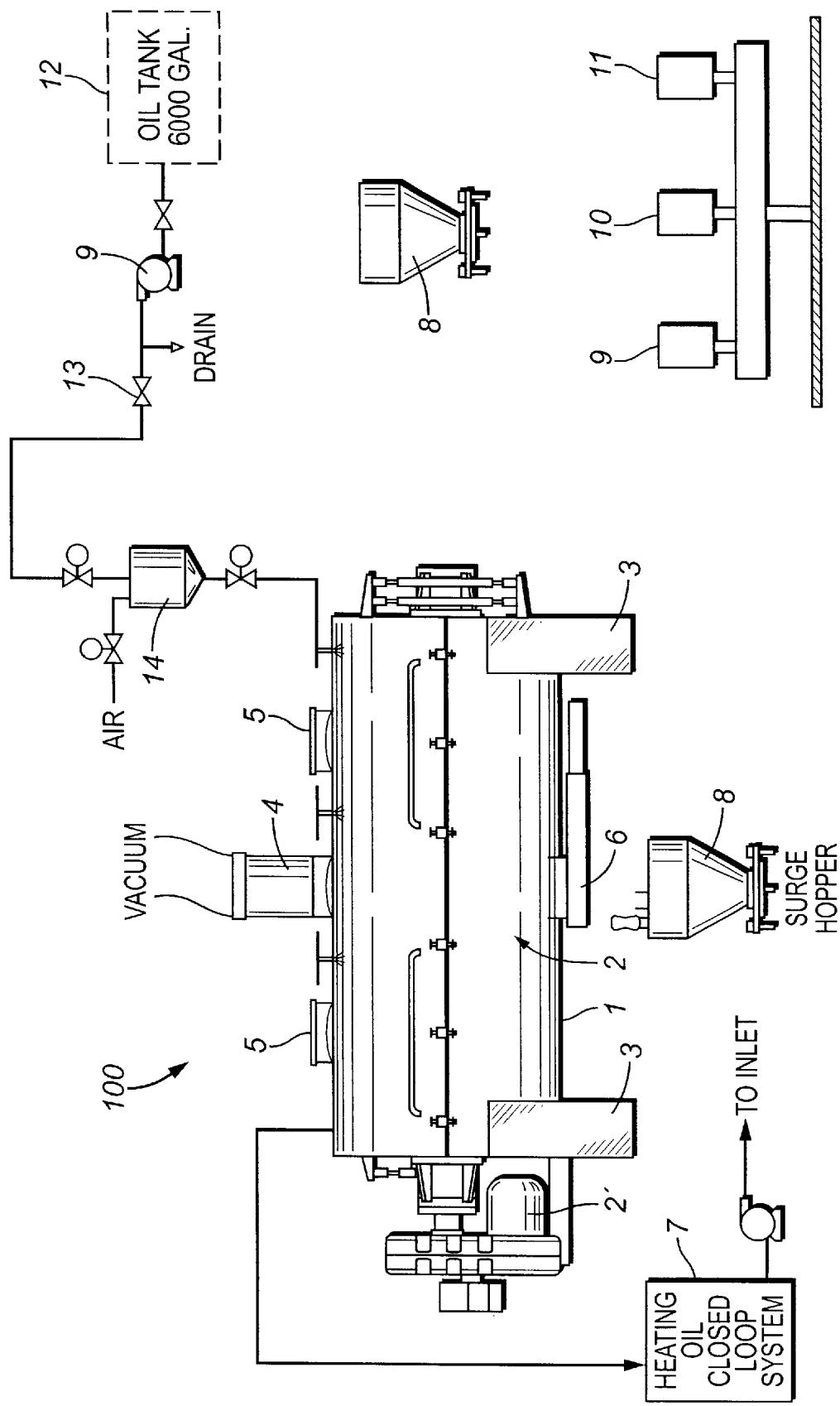
FIG. 1 is a side view, partly in section, of a horizontal mixer of the preferred embodiment of the present invention showing it in a layout drawing of the integrated parts of the mixer system including the support components to create a mix chamber environment supporting pressure and vacuum.
Figure 2:
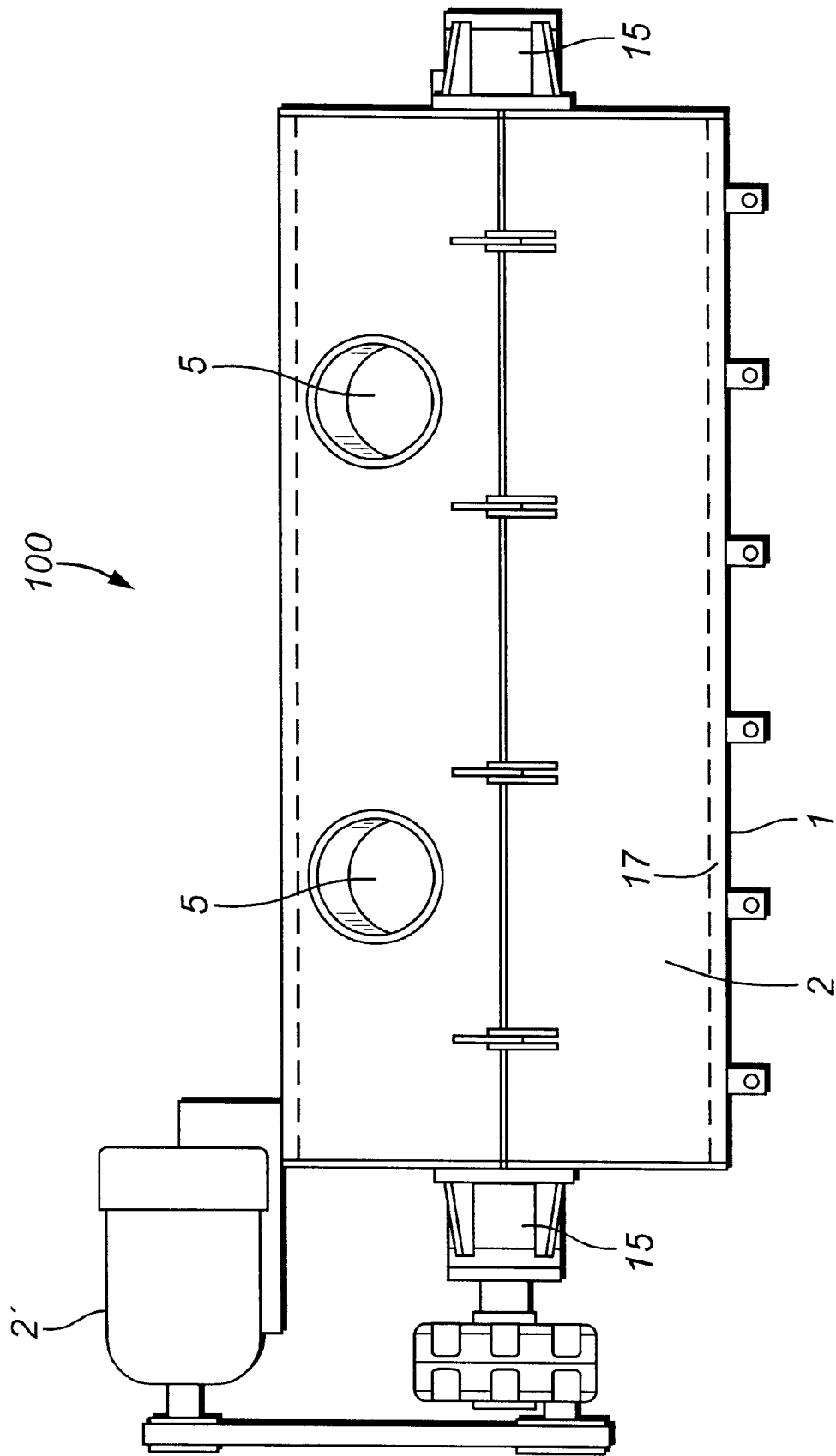
FIG. 2 is a top view of the horizontal mixer of the preferred embodiment of the present invention.

The present invention describes a method and apparatus to surface modify and substantially dry post-vulcanized cross-linked elastomer(s), such as crumb rubber. Crumb rubber is a granular solid typified by poor heat conductivity and irreversible chemical bonds. Vulcanized elastomer granules or powder of crumb rubber are hygroscopic by nature with latent moisture content of up to 1% when produced with traditional crumb rubber production technology. Crumb rubber, being a post vulcanized elastomer, exhibits poor bonding and flow characteristics interfering with its use in various heat driven manufacturing systems, such as thermo plastic molding, asphalt binder modification and moisture sensitive chemically catalyzed applications. Poor qualities of heat transference, heat aging and the crystallization of the rubber polymers also typify crumb rubber when exposed to prolonged heat to drive off moisture.

Post vulcanized cross-linked elastomer(s) which have been further processed by ambient or cryogenic or wet grinding into cured rubber granules or powder forms a primary component of the mixture to be made in accordance with this invention. The cured rubber particles used are of natural or synthetic rubber, or combination thereof, which has been substantially vulcanized or cured, as in the manufacture of automobile or truck tires. Scrap tires, including but not limited to, automobile and truck tires, constitute a primary source of available, useful cured rubber particles. With respect to scrap tires as a source of cured rubber particles, the mixture is equally effective with crumb rubber generated either from the side wall or tread of scrap automobile or truck tire carcasses. Common rubbers useful to the invention include, but are not limited to: natural rubber ("NR"), styrene butadiene rubber ("SBR"), isoprene, neoprene, nitrile, butyl and ethylene-propylene dien rubbers. There is no need to separate the rubbers by polymer content.

The preferred dry liquid concentrate, "DLC", is a homogeneous or uniform blend or combination or mixture of tall oil, tall oil heads, tall oil pitches, residues of tall oil production, or other fatty acids, post vulcanized elastomer(s) which have been processed into granules or powder (e.g., crumb rubber) and converting vulcanized crumb rubber into the DLC by absorption by the crumb rubber of such, for example, tall oil agents or other fatty acids, and then by mixing with other components Tall oil, fatty acids and residues of tall oil production provide the advantage of changing the crumb rubber to a dry liquid concentrate, when mixed with the crumb rubber, enhancing the crumb rubber's ability to bond and flow when used in thermo plastic, asphalt binder and chemically catalyzed manufacturing applications. Tall oil fatty acids and residues of tall oil production may also contain a moisture content of 1% or more when received from various manufactures.

The "DLC" enhances the performance capabilities by accelerating the heat blending cycle of the crumb rubber with asphalt or bitumen or other materials, thereby reducing the cost of blending equipment and reducing required energy facilitating use with, for example, aggregate or asphalt of a pavement mixture.

The mixtures whose method of manufacture disclosed in this invention substantially modify the temperature performance, both high and low, as well as increase the durability of various substances, such as asphalt pavement mixtures.

As shown in FIG. 1, the preferred mixing system to combine the tall oil, fatty acids and residues of tall oil production with the crumb rubber or other post-vulcanized cross-linked elastomer includes mixer 100 having an outer shell 1 and a mix chamber 2 defined by an inner shell. The outer shell 1 and mix chamber 2 define a hollow chamber 17 in between shells 1, 2. Chamber 17 has sufficient space to permit hot oil (not shown) to circulate through mix chamber 17. The inner shell of mix chamber 2 is heat conductive thereby permitting the hot oil (not shown) to heat the mix chamber 2.

Figure 3:
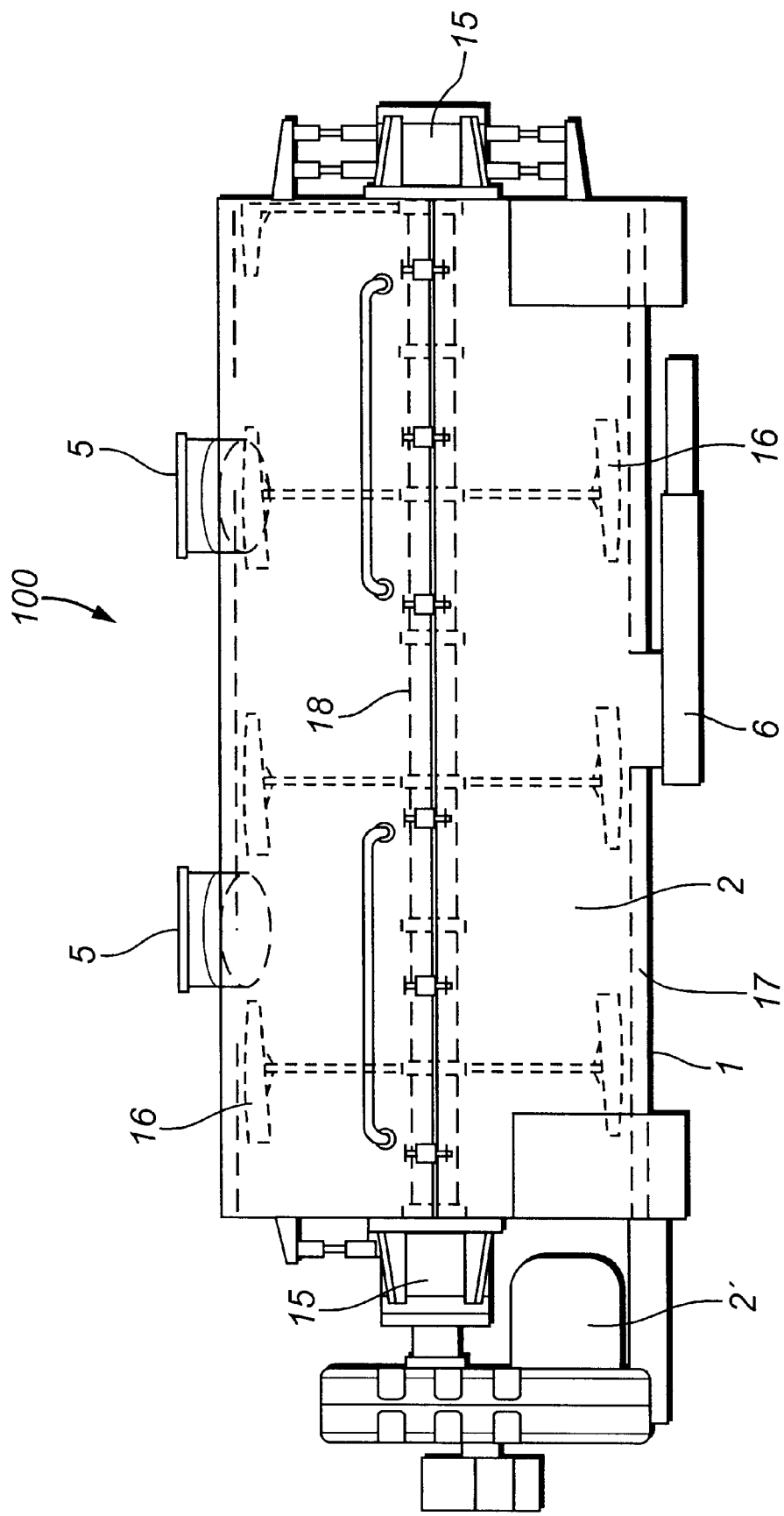
FIG. 3 is an internal view of the mixer interior of the preferred embodiment of the present invention.

The mixer 100 is provided with mixer paddles 16. Mix paddles 16 extend from mixer outer shell 1 into mix chamber 2. Mixer paddles 16 are mounted on mixer 100 and are sealed by shaft seals 15 sized to be capable of holding between 28 inches hg and 10 psi. Motor drives 2 are connected by means well known in the art to mixer paddle 16 to control the speed of the mixer paddle 16 so that mixer paddle 16 provides agitation to materials within mix chamber 2. As shown in FIG. 3, motor and drive 2 is connected to mixer shaft 18 which drives the mix paddles 16 to the appropriate foot per second rotational speed. Mix paddles 16 do not come into contact with the inner wall of mix chamber 2. The mixing action is desired to be of low shear with medium intensity to prevent excessive heat build up typically produced by friction in high intensity mix systems. Medium intensity mixing systems do not have high shear nor build up excessive heat. High intensity mixing systems may have high shear and do build heat from friction. Crumb rubber is a high friction material. Uncontrolled friction can heat age crumb rubber making it less useful. Industry standard systems, which provide this combination of requirements, are medium intensity horizontal mixers.

Powder feed ports 5, preferably two of them, are mounted on the top of outer shell 1 of mixer 100 and adapted to hold pressure in the mixing chamber 2. A pulse filtration system 4 is mounted on the outer shell 1 of mixer 100 at the top, between the feed ports 5. Reverse filtration system 4 is a reverse pulse filtration system that allows vacuum to be drawn when the mixer paddles 16 are turning without clogging vacuum lines or vacuum pump 10.

The mixing chamber 2 should preferably have control heating capability up to 400° F. For this purpose, a hot oil heating system 7 is provided as a close loop system to circulate hot oil in chamber 17. The system 7 should be sized to permit heating the mix chamber 2 to temperature ranging from 250° F. to 400° F.

Loading materials into mix chamber 2 are through powder feed ports 5, which extend from outer shell 1 through to mix chamber 2 (FIG. 3). Surge bins 8 are provided to be charged with powder or granules of the crumb rubber and are designed to lock in position on top of mixer 100 adjacent powder feed ports 5 to deliver powder granules of the crumb rubber to feed ports 5 and thence through the outer shell 1 to mix chamber 2.

A discharge port 6 having a discharge mixer gate to hold pressure is provided on the lowest end of mixer 100 which extends from the mix chamber 2 through the inner shell and through the outer shell 1. Accordingly, surge bins 8 when empty function to hold mix discharge from the gate of port 6 after the completion of the mix cycle.

A pump 9 is provided to pump tall oil by a line not shown to oil tank storage 12. Pump 9 provides hydraulic pressure to permit the pressurized tall oil to be metered to batch requirements by a flow valve 13. Flow valve 13 discharges into intermediate storage tank 14 which acts as a holding tank for the tall oil in readiness for each mix batch requirement.

A control system 11 is provided to control the mixing including cycle time for the process, mix chamber 2 temperature, mix paddle 16 speed and the vacuum and pressure requirements for each mix.

The dry liquid concentrate is made by combining the crumb rubber with tall oil. The mixing chamber is heated through the hot oil system, pump and heater 7 which are initiated and continue to operate through the mix cycle. The temperature of the mix chamber 100 is elevated to between 250° and 400° F. (higher temperature results in faster cycle) and preferably is heated up to 400° F.

The surge bin 8 is charged with up to 70% of the cubic volume of mix chamber 2 in crumb rubber. Surge bin 8 is connected to powder feed port 5. The second powder feed port 5 may or may not be used to add additional powder or pellet materials as required by a specific mix. Other powder, pellet or granular materials may be added at this time using the second powder feed port 5 or later in the cycle, such as, for example, after the tall oil is added, depending on the specific requirements. The mixer motor and drive 2 are initiated turning the mix paddles 16 continually including both charging and discharging the mixer 100. The mix chamber 2 is charged by the surge bin 8 through the feed port 5 with up to 70% of the cubic volume of the mix chamber 2 with crumb rubber. The tall oil is metered into the mix chamber 2 from storage tank 14 with an atomizing spray bar powered by liquid pump 9. Crumb rubber is loaded into the mixing chamber followed by a per weight addition of up to 40% of tall oil, fatty acids and residues of tall oil production and the mixing chamber is sealed. It is anticipated that other tackifers and plasticizers, which may be added in similar fashion to tall oil, may be found useful in the invention.

During the first stages of the mix cycle the latent moisture in the crumb rubber is allowed to build pressure in the mix chamber 2 up to 8 psi and preferably between 3 and 8 psi, due to the mixer shell 2 heat. The boiling point of water is increased above 212° F. under the added pressure. The heated moisture is a more efficient conductor of heat than the mixer chamber 2 inner shell. Vacuum is drawn at the end of the mix cycle by the vacuum pump 10 acting through reverse impulse filter 4 from the mixing chamber 2. Vacuum is drawn to between 24 and 28 inches hg. When vacuum is pulled, the boiling point of the water is lowered. The moisture turns to steam furthering the heat transfer throughout the dry liquid concentrate. The completed mix is discharged from the mix chamber 2 into an empty surge bin 8 through discharge port 6 and the cycle may then be repeated.

The above also illustrates the use only of a horizontal medium intensity batch mix system. A continuous system duplicating the heat, pressure, addition of tall oil and vacuum required could also be used. This use of pressure overcomes the poor transfer of heat typical to the crumb rubber. The use of pressure speeds up heat transfer and minimizes the time required to raise the temperature of the crumb rubber component of the mixture, and can be done at lower temperatures than other methods. When the pressure stabilizes or reaches 5 psi, a vacuum cycle is initiated. The vacuum is maintained until a minimum of for example 24 inches Hg is obtained.

The desired temperature of the discharged dry liquid concentrate mixture is between 200° F. and 275° F. Typical mix cycle times range between 10 and 15 minutes. The mixture is a free flowing granular solid upon discharge from the mixer.

As an experiment, a 300-liter horizontal mixer equipped with a vacuum pump and heated jacket was heated to 300° F. A 100-lb sample of 30-mesh crumb rubber was combined with tall oil, fatty acids and residues of tall oil production at a 10% by weight rate. A Carl Fisher moisture test was performed with pressure allowed to build to 4.7 psi during the first five minutes of the cycle. Vacuum was pulled to a total of 26.4 inches hg during the last five minutes of the cycle. Temperature at discharge was measured at 214° F. A Carl Fisher moisture test was again preformed yielding moisture content of 0.013%.

This experiment illustrates the advantages in reducing cycle time as well as increasing the effectiveness of drying by a factor of ten over the best product experiment set out in the BACKGROUND. The present process also reduces the heat aging exposure of the crumb rubber, reducing the potential crystallization of the rubber polymers by shortening the exposure time and reducing the heat of the discharged material.

It is anticipated that use of pressure generated from moisture ladened powders to quickly super dry, may be found useful with a wide range of materials.

Because many varying and different embodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A method for combining post vulcanized cross-linked elastomers with any of tall oil, fatty acids and residues of tall oil production (hereinafter "oils") to form a dry liquid concentrate which flows, comprising:
    charging a vessel with elastomers;
    heating the elastomers in the vessel while combining the elastomers with the oils to form a free flowing granular solid mix while the vessel is sealed;
    building the pressure in the vessel during said heating.

2. The method of claim 1, wherein said heating is carried on from a source having a temperature of 212° F. to 400° F.

3. The method of claim 1, wherein said heating is carried on from a source having a temperature of 250° F. to 400° F.

4. The method of claim 1, wherein said heating occurs while mixing the elastomers with the oils.

5. The method of claim 1, wherein the oils are added by spraying them on the elastomers.

6. The method of claim 1, wherein the amount of the oils added by a per weight addition is up to 40% of the weight of the elastomers.

7. The method of claim 1, wherein said building of the pressure is accomplished by continuing to perform said heating while the vessel is sealed.

8. The method of claim 7, wherein said building of pressure is less than 10 psi and greater than 24" of Hg.

9. The method of claim 7, wherein said building of pressure is in a range of 2 psi to 8 psi.

10. The method of claim 1, wherein after the end of said heating there is included the step of:
    drawing a vacuum in the vessel.

11. The method of claim 10, wherein said drawing a vacuum is in the range of 24 and 28 inches hg.

12. The method of claim 10, wherein there is included the further step of discharging the mix from the vessel.

13. The method of claim 10, wherein said drawing of vacuum occurs when the pressure in the vessel stabilizes.

14. The method of claim 1, wherein the oils have a temperature between 200° F. and 275° F.

15. The method of claim 1, wherein the mix cycle time ranges from 10 to 16 minutes.

* * * * *